(12) United States Patent
Jampani et al.

(10) Patent No.: US 11,636,668 B2
(45) Date of Patent: Apr. 25, 2023

(54) BILATERAL CONVOLUTION LAYER NETWORK FOR PROCESSING POINT CLOUDS

(71) Applicant: NVIDIA Corp., Santa Clara, CA (US)

(72) Inventors: Varun Jampani, Nashua, NH (US); Hang Su, Hadley, MA (US); Deqing Sun, Providence, RI (US); Ming-Hsuan Yang, Sunnyvale, CA (US); Jan Kautz, Lexington, MA (US)

(73) Assignee: NVIDIA CORP.

( * ) Notice: Subject to any disclaimer, the term of this patent is extended or adjusted under 35 U.S.C. 154(b) by 1061 days.

(21) Appl. No.: 15/986,267

(22) Filed: May 22, 2018

(65) Prior Publication Data

US 2019/0147302 A1 May 16, 2019

Related U.S. Application Data

(60) Provisional application No. 62/584,615, filed on Nov. 10, 2017.

(51) Int. Cl.
*G06V 10/82* (2022.01)
*G06N 3/04* (2023.01)
(Continued)

(52) U.S. Cl.
CPC .......... *G06V 10/82* (2022.01); *G06F 18/2415* (2023.01); *G06F 18/24143* (2023.01); *G06N 3/04* (2013.01); *G06T 7/521* (2017.01); *G06V 20/64* (2022.01); *G06V 30/19173* (2022.01); *G06N 3/08* (2013.01); *G06T 2200/04* (2013.01); *G06T 2207/10028* (2013.01); *G06T 2207/20081* (2013.01); *G06T 2207/20084* (2013.01); *G06V 2201/12* (2022.01)

(58) Field of Classification Search
CPC .... G06K 9/66; G06K 9/6274; G06K 9/00201; G06K 9/6277; G06K 2209/40; G06T 7/521; G06T 2200/04; G06T 2207/10028; G06T 2207/20084; G06T 2207/20081; G06T 2207/10004; G06T 2207/20016; G06T 7/11; G06T 7/174; G06N 3/04; G06N 3/08; G06N 3/0454; G06N 3/0481
See application file for complete search history.

(56) References Cited

U.S. PATENT DOCUMENTS 5,204,748 A 4/1993 Lagoni
6,247,003 B1 6/2001 Cummins et al.
(Continued)

OTHER PUBLICATIONS

Su et al., "Multi-View Convolutional Neural Network for 3D Shape Recognition", 2015, ICCV.*
(Continued)

*Primary Examiner* — John W Lee
(74) *Attorney, Agent, or Firm* — Rowan TELS LLC (57) ABSTRACT

A method includes filtering a point cloud transformation of a 3D object to generate a 3D lattice and processing the 3D lattice through a series of bilateral convolution networks (BCL), each BCL in the series having a lower lattice feature scale than a preceding BCL in the series. The output of each BCL in the series is concatenated to generate an intermediate 3D lattice. Further filtering of the intermediate 3D lattice generates a first prediction of features of the 3D object.

18 Claims, 7 Drawing Sheets

(51) Int. Cl.

| | |
|---|---|
| *G06T 7/521* | (2017.01) |
| *G06V 20/64* | (2022.01) |
| *G06V 30/19* | (2022.01) |
| *G06N 3/08* | (2023.01) |
| *G06T 7/11* | (2017.01) |
| *G06T 7/174* | (2017.01) |
| *G06F 18/2415* | (2023.01) |
| *G06F 18/2413* | (2023.01) |

(56) References Cited

U.S. PATENT DOCUMENTS

| | | | |
|---|---|---|---|
| 6,735,580 | B1 | 5/2004 | Li et al. |
| 8,488,877 | B1 | 7/2013 | Owechko et al. |
| 2002/0181751 | A1 | 12/2002 | Hale |
| 2005/0025378 | A1* | 2/2005 | Maurer ............. G06T 5/20 382/260 |
| 2007/0043452 | A1 | 2/2007 | Buscema |
| 2007/0253618 | A1 | 11/2007 | Kim et al. |
| 2008/0140594 | A1 | 6/2008 | Tannhof et al. |
| 2010/0166294 | A1 | 7/2010 | Marrion et al. |
| 2011/0182469 | A1 | 7/2011 | Ji et al. |
| 2020/0019794 | A1* | 1/2020 | Engelcke ............ G06V 10/82 |

OTHER PUBLICATIONS

D. Boscaini, J. Masci, S. Melzi, M.M. Bronstein, U. Castellani, and P.Vandergheynst, Learning class-specific descriptors for deformable shapes using localized spectral convolutional networks, In Proceedings of the Symposium on Geometry Processing, 2015. 2.

D. Boscaini, J. Masci, E. Rodol, and M.M. Bronstein, Learning shape correspondence with anisotropic convolutional neural networks, In The Conference and Workshop on Neural Information Processing Systems (NIPS 16), 2016.

M.M. Bronstein, J. Bruna, Y. Lecun, A. Szlam, and P. Vandergheynst, Geometric deep learning: Going beyond euclidean data, IEEE Signal Processing Magazine, 34(4):18-42, 2017. 3.

J. Bruna, W. Zaremba, A.Szlam, and Y. Lecun, Spectral networks and locally connected networks on graphs. CoRR, abs/1312.6203, 2013. 2.

Z. Cao, Q. Huang, and K. Ramani, 3d object classification via spherical projections, In 3DV, 2017. 1, 2.

M. Defferrard, X. Bresson, and P. Vandergheynst, Convolutional neural networks on graphs with fast localized spectral filtering. CoRR, abs/1606.09375, 2016. 2.

D. Ezuz, J. Solomon, V.G. Kim, and M. Ben-Chen, Gwcnn: A metric alignment layer for deep shape analysis,Computer Graphics Forum, 36 (5), 2017. 2.

A. Garcia-Garcia, F. Gomez-Donoso, J.G. Rodr'iguez, S. Orts, M. Cazorla, and J.A. L'opez, Pointnet: A 3d convolutional neural network for real-time object class recognition, 2016 International Joint Conference on Neural Networks (UCNN), pp. 1578-1584, 2016. 2.

B. Graham and L. Van Der Maaten, Submanifold sparse convolutional networks. arXiv preprint arXiv: 1706.01307, 2017. 2.

V. Hegde and R. Zadeh, Fusionnet: 3d object classification using multiple data representations. CoRR, abs/1607.05695, 2016. 3.

M. Henaff, J. Bruna and Y. Lecun, Deep convolutional networks on graph-structured data, CoRR, abs/1506.05163, 2015. 2.

V. Jampani, M.Kiefel, and P.V. Gehler, Learning sparse high dimensional filters: Image filtering, dense crfs and bilateral neural networks, In Proc. CVPR, 2016. 1, 3, 4.

E. Kalogerakis, M. Averkiou, S. Maji, and S. Chaudhuri, 3D shape segmentation with projective convolutional networks, In Proc. CVPR, 2017. 1, 2.

R. Klokov and V. Lempitsky, Escape from cells: Deep kdnetworks for the recognition of 3D point cloud models, In Proc. ICCV, 2017. 2, 8.

J. Masci, D. Boscaini, M. Bronstein, and P. Vandergheynst, Geodesic convolutional neural networks on riemannian manifolds, In Proceedings of the IEEE International Conference on Computer Vision Workshops, 2015. 2.

D. Maturana and S. Scherer, 3D convolutional neural networks for landing zone detection from lidar, In IEEE International Conference on Robotics and Automation (ICRA 15), 2015. 2.

F. Monti, D. Boscaini, J. Masci, E. Rodola, J. Svoboda, and M. M. Bronstein, Geometric deep learning on graphs and manifolds using mixture model cnns, In IEEE Conference on Computer Vision and Pattern Recognition (CVPR 17), 2017.

C. R. Qi, H.Su, K. Mo, and L. J. Guibas, Pointnet: Deep learning on point sets for 3d classification and segmentation, In CVPR, 2017. 1, 2, 4, 8.

C. R. Qi, H.Su, M. Niener, A. Dai, M. Yan, and L.J. Guibas, Volumetric and multi-view cnns for object classification on 3D data, In IEEE Conference on Computer Vision and Pattern Recognition (CVPR 16), 2016. 1, 2.

C. R. Qi, L. Yi, H. Su, and L. Guibas, Pointnet++: Deep hierarchical feature learning on point sets in a metric space, In NIPS, 2017. 1, 2, 8.

G. Riegler, A. O. Ulusoy, H. Bischof, and A. Geiger, Octnetfusion: Learning depth fusion from data, In Proceedings of the International Conference on 3D Vision, 2017. 2.

G. Riegler, A. O. Ulusoys, and A. Geiger, Octnet: Learning deep 3D representations at high resolutions, In Proc. CVPR, 2017. 1, 2, 6, 7.

N. Sedaghat, M, Zolfaghari, E. Amiri, and T. Brox, Orientationboosted voxel nets for 3d object recognition, In British Machine Vision Conference (BMVC), 2017. 2.

A. Sinha, J. Bai, and K. Ramani, Deep learning 3D shape surfaces using geometry images, In European Conference on Computer Vision (ECCV 16), 2016. 2.

H. Su, S. Maji, E. Kalogerakis, and E.G, Learned-Miller. Multiview convolutional neural networks for 3D shape recognition, In Proc. ICCV, 2015. 1, 2.

M. Tatarchenko, A. Dosovitskiy, and T. Brox, Octree generating networks: Efficient convolutional architectures for high-resolution 3d outputs, In IEEE International Conference on Computer Vision (ICCV), 2017. 2.

P.-S. Wang, Y. Liu, Y.-X. Guo, C.-Y. Sun, and X. Tong, O-cnn: Octree-based convolutional neural networks for 3d shape analysis, ACM Trans. Graph., 36(4), 2017. 1, 2.

L. Yi, H. Su, X. Guo, and L. Guibas, Syncspeccnn: Synchronized spectral cnn for 3D shape segmentation, In Proc. CVPR, 2017. 2, 8.

\* cited by examiner

BILATERAL CONVOLUTION LAYER NETWORK FOR PROCESSING POINT CLOUDS

CROSS-REFERENCE TO RELATED APPLICATIONS

This application claims priority and benefit under 35 U.S.C. 119(e) to U.S. application Ser. No. 62/584,615, filed on Nov. 10, 2017, the contents of which are incorporated herein by reference in their entirety.

BACKGROUND

Data obtained with modern 3D sensors such as laser scanners is predominantly in the irregular format of point clouds or meshes. Analysis of point cloud sensor data by machine vision systems has several useful applications such as robot manipulation and autonomous driving. A point cloud consists of a sparse and unordered set of 3D points. These properties of point clouds make it difficult to use traditional convolutional neural network (CNN) architectures for point cloud processing. As a result, existing approaches that directly operate on point clouds are dominated by hand-crafted features.

One way to use CNNs for point clouds is by first pre-processing a given point cloud in a form that is amenable to standard spatial convolutions. Following this route, most deep architectures for 3D point cloud analysis require pre-processing of irregular point clouds into either voxel representations or 2D images by view projection. This is due to the ease of implementing convolution operations on regular 2D or 3D lattices.

However, transforming point cloud representation to either 2D images or 3D voxels would often result in artifacts and more importantly, a loss in some natural invariances present in point clouds. Recently, a few network architectures have been developed to directly work on point clouds. One of the main drawbacks of these architectures is that they do not allow a flexible specification of the extent of spatial connectivity across points (filter neighborhood). These approaches use max-pooling to aggregate information across points either globally or in a hierarchical manner. This pooling aggregation may lose surface information because the spatial layouts of points are not explicitly considered. It is desirable to capture spatial relationships in input point clouds through more general convolution operations while being able to specify filter extents in a flexible manner.

BRIEF SUMMARY

An artificial neural network architecture for machine vision is disclosed that directly operates on a point cloud represented as a sparse set of samples in a high-dimensional lattice. The network uses sparse bilateral convolutional layers as building blocks. These layers maintain efficiency by using indexing structures to apply convolutions only on occupied parts of the lattice, allow flexible specification of the lattice structure enabling hierarchical and spatially-aware feature learning, as well as joint 2D-3D feature predictions. Both point-based and image-based representations can be easily incorporated in the network and the resulting vision system can be trained in an end-to-end manner. The artificial network may be incorporated into machine vision systems that operate on the inputs of sensors that generate point cloud arrays, as further explained in the Detailed Description below, to directly and noticeably improve the object recognition accuracy and efficiency of those systems.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Terminology used herein should be accorded its conventional meaning in the arts, unless otherwise indicated expressly or by implication.

"SoftMax layer" herein refers to a common final layer of a neural network-based classifier.

"Pooling layer" herein refers to combining the outputs of neuron clusters at one layer of a neural network into a single neuron in the next layer. Pooling layers can apply local or global pooling. For example, max pooling uses the maximum value from each of a cluster of neurons at the prior layer. Average pooling uses the average value from each of a cluster of neurons at the prior layer.

"BatchNorm layer" herein refers to an embedded transformational layer in a neural network that normalizes the inputs to a subsequent activation layer, by maintaining the mean activation close to 0 and the activation standard deviation close to 1.

"ReLU" herein refers to rectified linear unit, a common activation function utilized in deep neural networks.

"1×1 convolution layer" herein refers to a convolution layer in a neural network to perform feature dimension reduction or enlargement. For example, an image of 200× 200 with 50 features on convolution with 20 filters of 1×1 would result in size of 200×200×20. 1×1 convolution may be useful as a 'feature pooling' technique. 1×1 convolution may be used to perform a coordinate-dependent transformation in the filter space. Often, a 1×1 convolution layer is succeeded in the neural network by a non-linear activation layer like ReLU.

"End-to-end training" herein refers to a network that learns from the sampled dataset without supervised (manual) intervention.

"Bilateral filtering" herein refers to a smoothing filter that replaces the intensity of each pixel with a weighted average of intensity values from nearby pixels. In the systems described herein, the weight values are learned parameters that evolve based on the input data. Bilateral filtering herein refers to a type of sparse high-dimensional filtering. The weights may depend on features such as the Euclidean distance between pixels and on radiometric differences (e.g., range differences, such as color intensity, depth distance, etc.). Bilateral filtering tends to preserve sharp edges in the image.

A bilateral point cloud network (BPCN) is an artificial neural network that utilizes one or more bilateral convolution (BCONV) layers for point cloud processing. Each BCONV layer utilizes bilateral filtering on cloud features such as $<r, g, b, n_x, n_y, n_z>$, where r, g, and b are the color features of a point, and $n_x$, $n_y$, and $n_z$ are the spatial coordinates of a point. One BCONV layer may operate on features output from a previous layer. An exemplary filter used by BCONV layers is the well-known Gaussian filter.

Figure 1:
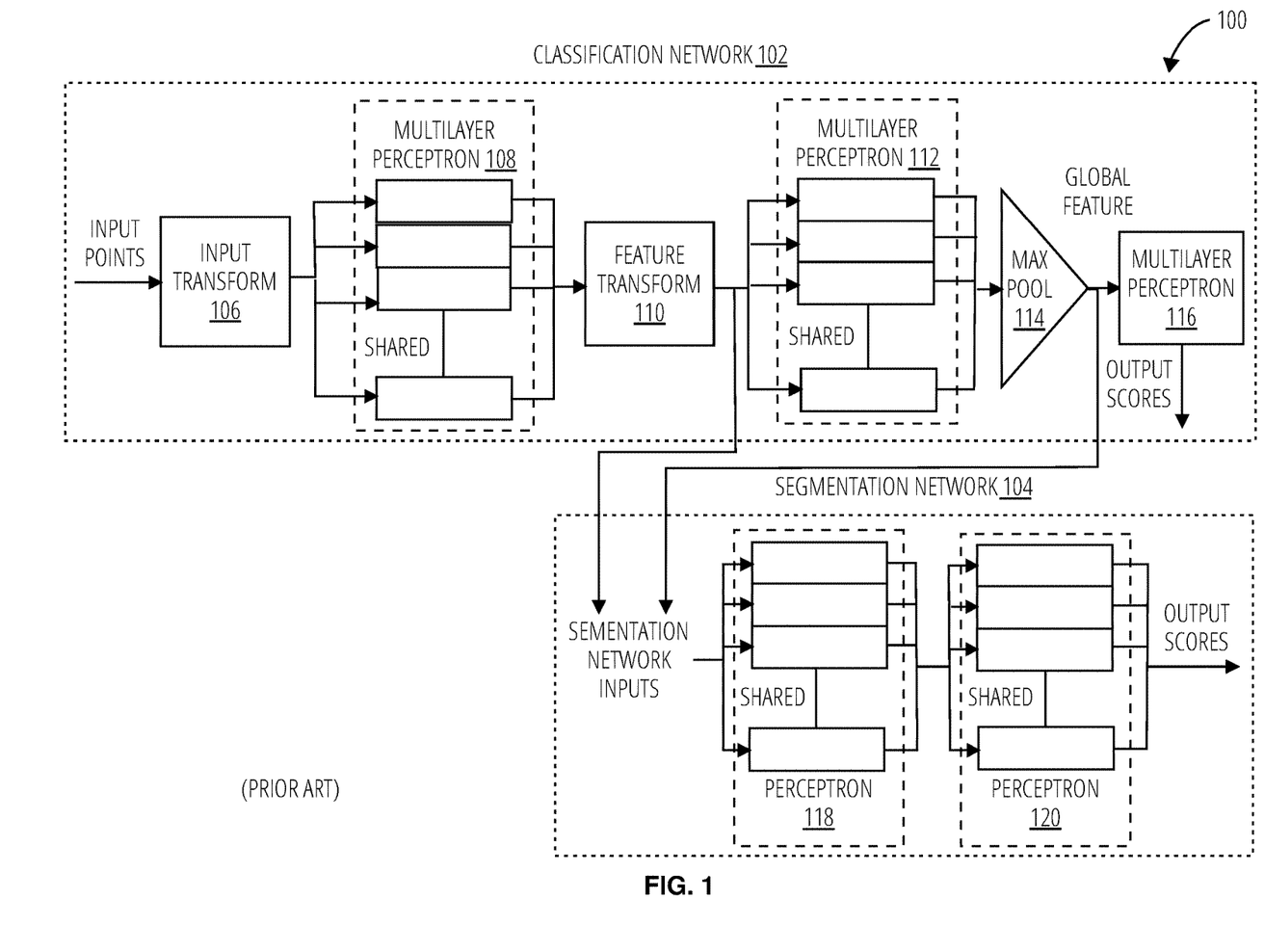
FIG. 1 illustrates an embodiment of a network 100.

Referring to FIG. 1, a conventional point cloud processing network 100 comprises a classification network 102 and a segmentation network 104. The classification network 102 further comprises an input transform 106, a multilayer perceptron 108, a feature transform 110, a multilayer perceptron 112, a max pool 114, and a multilayer perceptron 116. The segmentation network 104 further comprises a multilayer perceptron 118, and a multilayer perceptron 120.

The classification network 102 receives input points at the input transform 106. The input points may be n×3 in shape. The input transform 106 utilizes a T-Net (transform network) and a matrix multiplier to transform the input. The output from the input transform 106 is sent to the multilayer perceptron 108. The multilayer perceptron 108 may be (64, 64) producing an output with a shape of n×64. The output of the multilayer perceptron 108 is then sent to the feature transform 110. The feature transform 110 may have a T-Net and a matrix multiplier and produce an output of shape n×64, which is sent to both the segmentation network 104 and the multilayer perceptron 112. The multilayer perceptron 112 may be (64, 128, 1024) and produce an output of shape n×1024. The output is sent to the max pool 114, which reduces the input of shape n×1024 to a global feature. The global feature is 1×1024. The global feature is sent to the segmentation network 104 and the multilayer perceptron 116. The multilayer perceptron 116 operates on the global feature to produce output scores. The multilayer perceptron 116 may have a size (512, 256, k), and the output scores may have a size k.

The segmentation network 104 receives the output from the feature transform 110 and the global feature. The segmentation network 104 may concatenate the output from the feature transform 110 with the global feature to generate an input of shape n×1088. The concatenated input is sent to the multilayer perceptron 118. The multilayer perceptron 118 may be (512, 256, 128) and produce an output of shape n×128. That output is sent to the multilayer perceptron 120, which may be (128, m). The multilayer perceptron 120 then produces further output scores of shape n×m.

Examples will now be described for various bilateral point cloud networks for different specific tasks.

Figure 2:
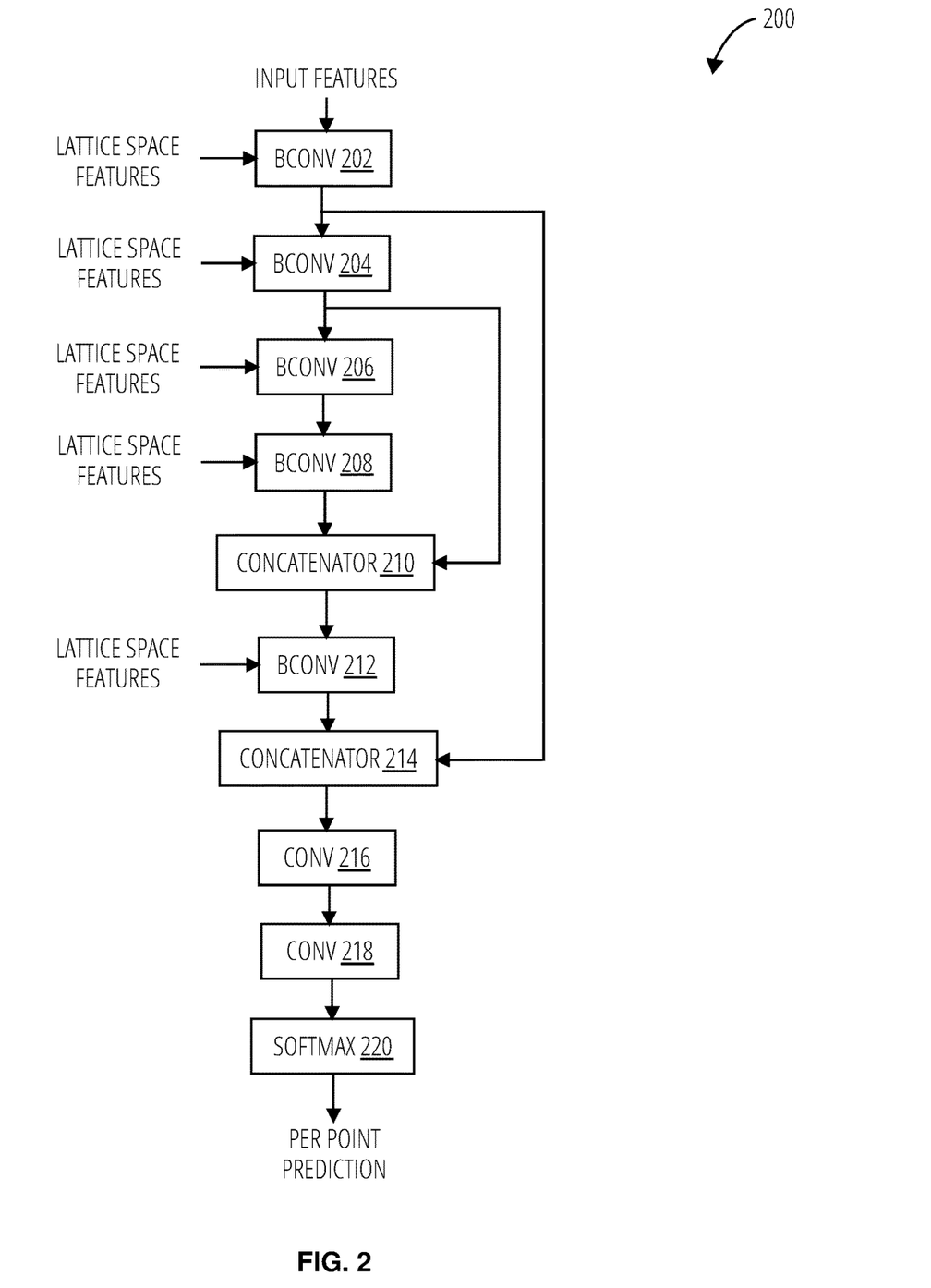
FIG. 2 illustrates an embodiment of a bilateral point cloud network 200.

Referring to FIG. 2, a bilateral point cloud network 200 for 3D semantic segmentation in one embodiment comprises a bilateral convolution layer 202, a bilateral convolution layer 204, a bilateral convolution layer 206, a bilateral convolution layer 208, a concatenator 210, a bilateral convolution layer 212, a concatenator 214, a convolution layer 216, a convolution layer 218, and a SoftMax function translator 220.

The bilateral convolution layer 202 receives input features and lattice space features. The input features may have a shape N×D, where N is the number of points and D may include features such as $<r, g, b, n_x, n_y, n_z>$. The corresponding lattice space features may be N×L, where L are lattice dimensions, such as $<x,y,z>$. The scale may be 160 and may be similar to or different from the other BCONV layers. The bilateral convolution layer 202 may have a number of filters, such as 64. The bilateral convolution layer 202 performs bilateral filtering. In some embodiments, the bilateral convolution layer 202 also performs a batch normalization (BNORM) function and a rectified linear unit function (ReLU). The output of the bilateral convolution layer 202 is sent to the bilateral convolution layer 204 and the concatenator 214.

The bilateral convolution layer 204 receives the output from the bilateral convolution layer 202 and lattice space features. The lattice space features may be N×L, where L are lattice dimensions, such as $<x,y,z>$. The scale may be 80. The bilateral convolution layer 204 may have a number of filters, such as 128. The bilateral convolution layer 204 performs bilateral filtering. In some embodiments, the bilateral convolution layer 204 also performs BNORM and ReLU. The output of the bilateral convolution layer 204 is sent to the bilateral convolution layer 206 and the concatenator 210.

The bilateral convolution layer 206 receives the output from the bilateral convolution layer 204 and lattice space features. The lattice space features may be N×L, where L are lattice dimensions, such as $<x,y,z>$. The scale may be 40. The bilateral convolution layer 206 may have a number of filters, such as 128. The bilateral convolution layer 206 performs bilateral filtering. In some embodiments, the bilateral convolution layer 206 also performs BNORM and ReLU. The output of the bilateral convolution layer 206 is sent to the bilateral convolution layer 208.

The bilateral convolution layer 208 receives the output from the bilateral convolution layer 206 and lattice space features. The lattice space features may be N×L, where L are lattice dimensions, such as $<x,y,z>$. The scale may be 80. The bilateral convolution layer 208 may have a number of filters, such as 128. The bilateral convolution layer 208 performs bilateral filtering. In some embodiments, the bilateral convolution layer 208 also performs BNORM and ReLU. The output of the bilateral convolution layer 208 is sent to the concatenator 210.

The concatenator 210 receives the outputs from the bilateral convolution layer 204 and the bilateral convolution layer 208. The concatenator 210 concatenates those outputs and sends that output to the bilateral convolution layer 212.

The bilateral convolution layer 212 receives the output from the concatenator 210 and lattice space features. The lattice space features may be N×L, where L are lattice dimensions, such as $<x,y,z>$. The scale may be 160. The bilateral convolution layer 208 may have a number of filters, such as 64. The bilateral convolution layer 212 performs bilateral filtering. In some embodiments, the bilateral convolution layer 212 also performs BNORM and ReLU. The output of the bilateral convolution layer 212 is sent to the concatenator 214.

The concatenator 214 receives the outputs from the bilateral convolution layer 202 and the bilateral convolution layer 212. The concatenator 214 concatenates those outputs and sends that output to the convolution layer 216.

The convolution layer 216 receives the output from the concatenator 214, performs a convolution utilizing a number of filters, such as 64, and sends the output to the convolution layer 218. In some embodiments, the convolution layer 216 also performs BNORM and ReLU.

The convolution layer 218 receives the output from the convolution layer 216, performs a convolution utilizing a number of filters, such as C, and sends the output to the SoftMax function translator 220. In some embodiments, the convolution layer 218 also performs BNORM and ReLU. The number of filters, C, may be an input to the convolution layer 218.

The SoftMax function translator 220 receives the output from the convolution layer 218, applies a SoftMax function to that output, and outputs a 3D semantic segmentation per point prediction.

Figure 3:
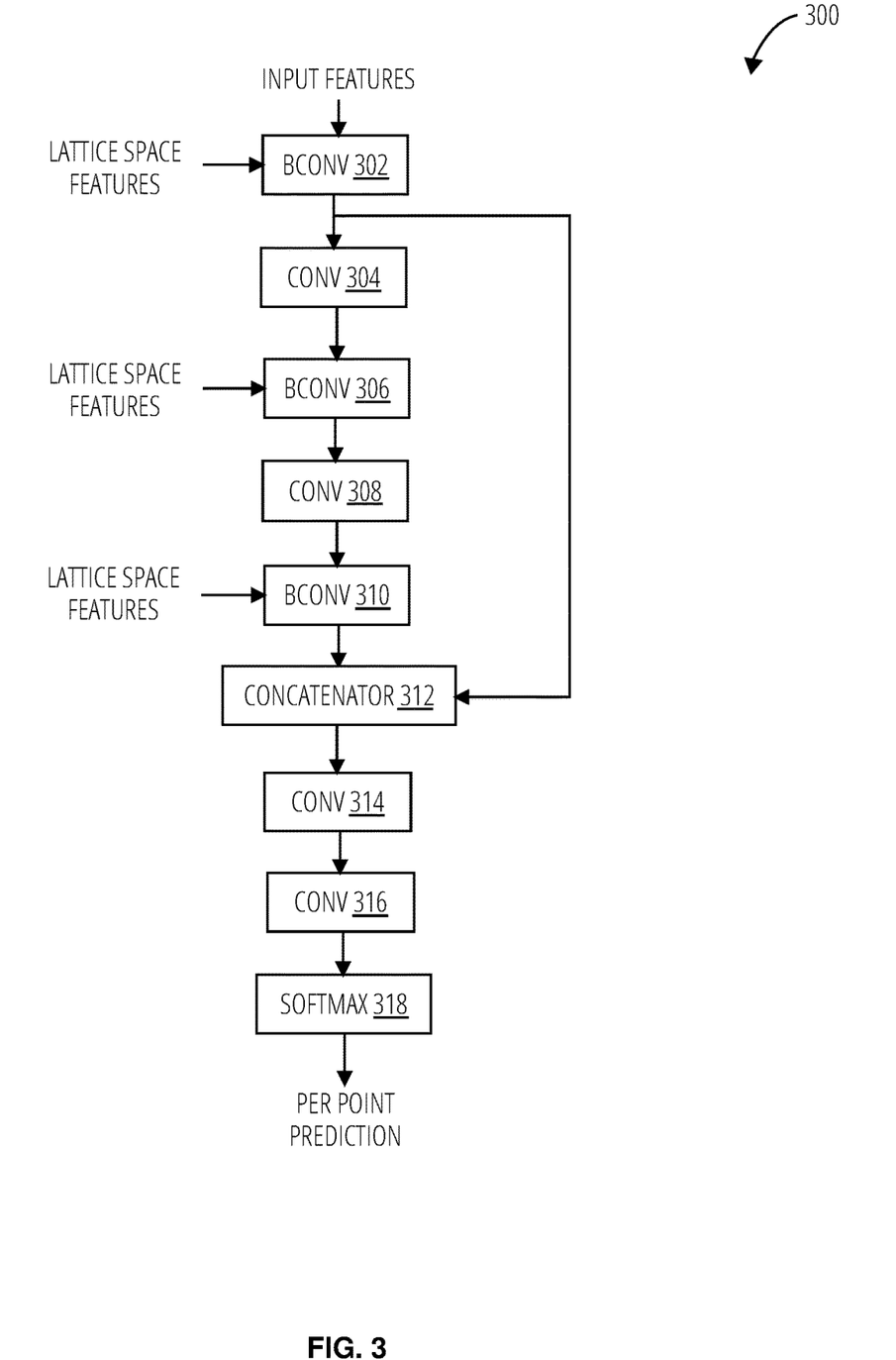
FIG. 3 illustrates an embodiment of a bilateral point cloud network 300.

Referring now to FIG. 3, a bilateral point cloud network 300 for 3D semantic segmentation may utilize bilateral convolution layers interleaved with regular convolution layers. The bilateral point cloud network 300 comprises a bilateral convolution layer 302, a convolution layer 304, a bilateral convolution layer 306, a convolution layer 308, a bilateral convolution layer 310, a concatenator 312, a convolution layer 314, a convolution layer 316, and a SoftMax function translator 318.

The bilateral convolution layer 302 receives input features and lattice space features. The input features may have a shape N×D, where N is the number of points and D may include parameters such as <r, g, b, $n_x$, $n_y$, $n_z$>. The lattice space features may be N×L, where L are lattice dimensions, such as <x,y,z>. The scale may be 160. The bilateral convolution layer 302 may have a number of filters, such as 64. The bilateral convolution layer 302 performs bilateral filtering. In some embodiments, the bilateral convolution layer 302 also performs BNORM and ReLU. The output of the bilateral convolution layer 302 is sent to the convolution layer 304 and the concatenator 312.

The convolution layer 304 receives the output from the bilateral convolution layer 302, performs a convolution utilizing a number of filters, such as 128, and sends the output to the bilateral convolution layer 306. In some embodiments, the convolution layer 304 also performs BNORM and ReLU.

The bilateral convolution layer 306 receives the output from the convolution layer 304 and lattice space features. The lattice space features may be N×L, where L are lattice dimensions, such as <x,y,z>. The scale may be 80. The bilateral convolution layer 306 may have a number of filters, such as 128. The bilateral convolution layer 306 performs bilateral filtering. In some embodiments, the bilateral convolution layer 306 also performs BNORM and ReLU. The output of the bilateral convolution layer 306 is sent to the convolution layer 308.

The convolution layer 308 receives the output from the bilateral convolution layer 306, performs a convolution utilizing a number of filters, such as 128, and sends the output to the bilateral convolution layer 310. In some embodiments, the convolution layer 308 also performs BNORM and ReLU.

The bilateral convolution layer 310 receives the output from the convolution layer 308 and lattice space features. The lattice space features may be N×L, where L are lattice dimensions, such as <x,y,z>. The scale may be 160. The bilateral convolution layer 208 may have a number of filters, such as 64. The bilateral convolution layer 310 performs bilateral filtering. In some embodiments, the bilateral convolution layer 310 also performs BNORM and ReLU. The output of the bilateral convolution layer 310 is sent to the concatenator 312.

The concatenator 312 receives the outputs from the bilateral convolution layer 302 and the bilateral convolution layer 310. The concatenator 312 concatenates those outputs and sends that output to the convolution layer 314.

The convolution layer 314 receives the output from the concatenator 312, performs a convolution utilizing a number of filters, such as 64, and sends the output to the convolution layer 316. In some embodiments, the convolution layer 314 also performs BNORM and ReLU.

The convolution layer 316 receives the output from the convolution layer 314, performs a convolution utilizing a number of filters, such as C, and sends the output to the SoftMax function translator 318. In some embodiments, the convolution layer 316 also performs BNORM and ReLU. The number of filters, C, may be an input to the convolution layer 316.

The SoftMax function translator 318 receives the output from the convolution layer 316, applies a SoftMax function to that output, and outputs a 3D semantic segmentation per point prediction.

Figure 4:
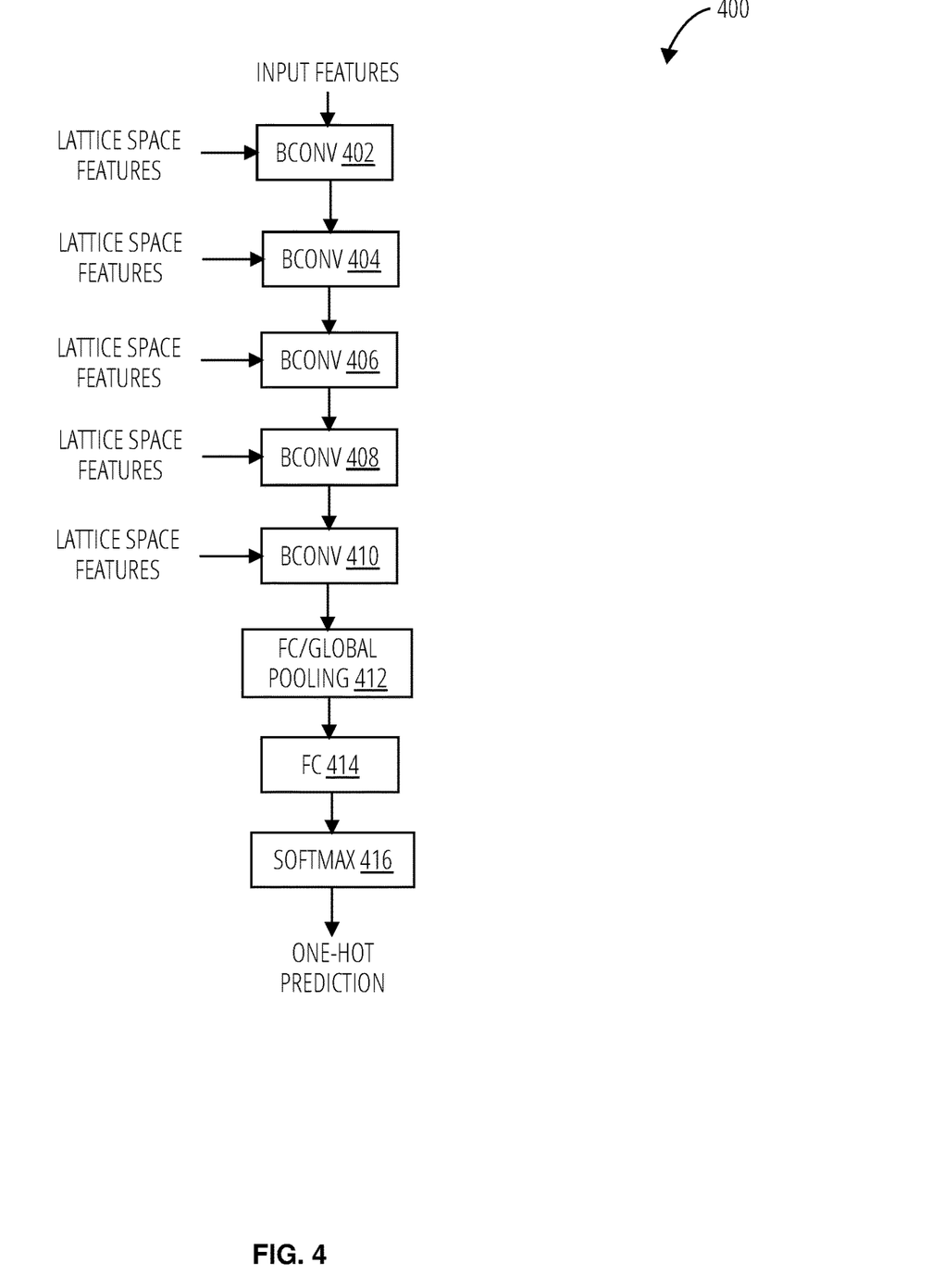
FIG. 4 illustrates an embodiment of a bilateral point cloud network 400.

Referring to FIG. 4, a bilateral point cloud network 400 for 3D object classification comprises a bilateral convolution layer 402, a bilateral convolution layer 404, a bilateral convolution layer 406, a bilateral convolution layer 408, a bilateral convolution layer 410, a fully connected and global pooling layer 412, a fully connected layer 414, and a SoftMax function translator 416.

The bilateral convolution layer 402 receives input features and lattice space features. The input features may have a shape N×D, where N is the number of points and D may include parameters such as <r, g, b, $n_x$, $n_y$, $n_z$>. The lattice space features may be N×L, where L are lattice dimensions, such as <x,y,z>. The scale may be 160. The bilateral convolution layer 402 may have a number of filters, such as 64. The bilateral convolution layer 402 performs bilateral filtering. In some embodiments, the bilateral convolution layer 402 also performs BNORM and ReLU. The output of the bilateral convolution layer 402 is sent to the bilateral convolution layer 404.

The bilateral convolution layer 404 receives the output from the bilateral convolution layer 402 and lattice space features. The lattice space features may be N×L, where L are lattice dimensions, such as <x,y,z>. The scale may be 80. The bilateral convolution layer 404 may have a number of filters, such as 128. The bilateral convolution layer 404 performs bilateral filtering. In some embodiments, the bilateral convolution layer 404 also performs BNORM and ReLU. The output of the bilateral convolution layer 404 is sent to the bilateral convolution layer 406.

The bilateral convolution layer 406 receives the output from the bilateral convolution layer 404 and lattice space features. The lattice space features may be N×L, where L are lattice dimensions, such as <x,y,z>. The scale may be 40. The bilateral convolution layer 406 may have a number of filters, such as 256. The bilateral convolution layer 406 performs bilateral filtering. In some embodiments, the bilateral convolution layer 406 also performs BNORM and ReLU. The output of the bilateral convolution layer 406 is sent to the bilateral convolution layer 408.

The bilateral convolution layer 408 receives the output from the bilateral convolution layer 406 and lattice space features. The lattice space features may be N×L, where L are lattice dimensions, such as <x,y,z>. The scale may be 80. The bilateral convolution layer 408 may have a number of filters, such as 256. The bilateral convolution layer 408 performs bilateral filtering. In some embodiments, the bilateral convolution layer 408 also performs BNORM and ReLU. The output of the bilateral convolution layer 408 is sent to the bilateral convolution layer 410.

The bilateral convolution layer 410 receives the output from the bilateral convolution layer 408 and lattice space features. The lattice space features may be N×L, where L are lattice dimensions, such as <x,y,z>. The scale may be 160.

The bilateral convolution layer 410 may have a number of filters, such as 256. The bilateral convolution layer 410 performs bilateral filtering. In some embodiments, the bilateral convolution layer 410 also performs BNORM and ReLU. The output of the bilateral convolution layer 410 is sent to the fully connected and global pooling layer 412.

The fully connected and global pooling layer 412 receives the output from the bilateral convolution layer 410. The fully connected and global pooling layer 412 then performs a global function, such as global averaging or global max to reduce the output to a shape of 1×256 (based on the number of filters in concatenator 210). The output is sent to the fully connected layer 414.

The fully connected layer 414 receives the output from the fully connected and global pooling layer 412 and utilizes C filters to produce an output of shape 1×C, which is sent to the SoftMax function translator 416.

The SoftMax function translator 416 receives the output of the fully connected layer 414, performs a SoftMax transform on that output, and produces a one-hot prediction of shape 1×C.

Figure 5:
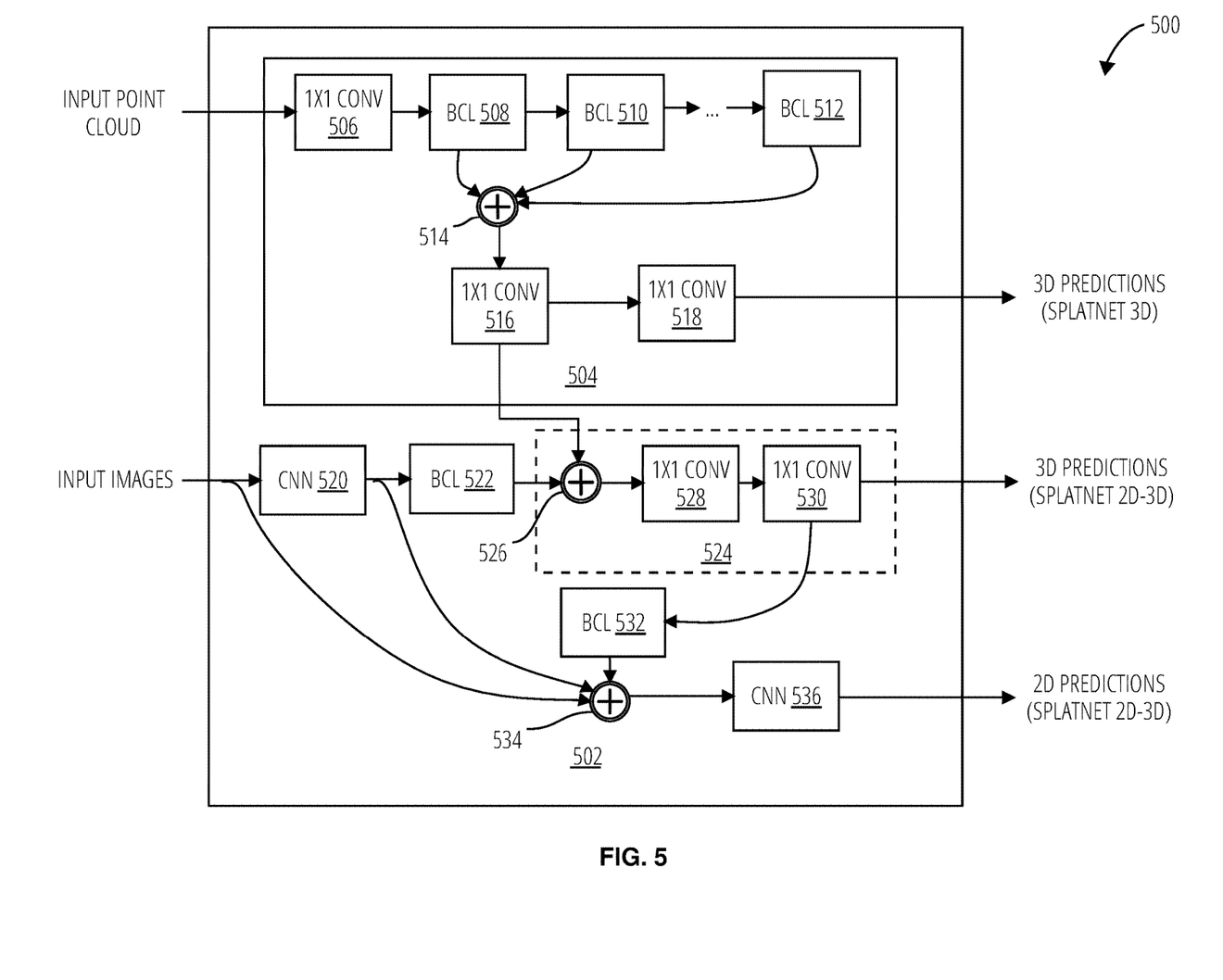
FIG. 5 illustrates an embodiment of a network 500.

Referring to FIG. 5, a network 500 for 3D and 2D feature prediction comprises a joint 2D-3D network 502, which further comprises a 3D network 504 and a convolutional neural network 520, a bilateral convolution layer 522, a 2D-3D fusion module 524, a bilateral convolution layer 532, a concatenator 534, and a convolutional neural network 536. The 2D-3D fusion module 524 comprises a concatenator 526, a convolution layer 528, and a convolution layer 530. The 3D network 504 further comprises a convolution layer 506, a bilateral convolution layer 508, a bilateral convolution layer 510, a bilateral convolution layer 512, a concatenator 514, a convolution layer 516, and a convolution layer 518.

The 3D network 504 is an embodiment of a network architecture that operates on 3D point clouds. The input to the 3D network 504 is a 3D point cloud $F \in R^{n \times d}$, where n denotes the number of points and d≥3 denotes the number of feature dimensions including XYZ point locations. Additional features are often available either directly from 3D sensors or through preprocessing. These may be RGB colors, surface normal directions, curvature, etc. at the input points. As output, the 3D network 504 produces per-point predictions for 3D features and also, potentially, for 2D features. Tasks such as 3D semantic segmentation and 3D object part labeling may be performed utilizing this framework. With techniques such as global pooling, the 3D network 504 may be modified to produce a single vector as output and thus may be extended to other tasks, such as classification.

The architecture of the 3D network 504 is depicted in FIG. 5. The 3D network 504 starts with the convolution layer 506. The convolution layer 506 may be a 1×1 convolution (CONV) layer. The convolution layer 506 may be followed by a series of bilateral convolution layers (BCLs), such as the bilateral convolution layer 508, the bilateral convolution layer 510, and the bilateral convolution layer 512. The convolution layer 506 processes each input point separately without data aggregation. The functionality of each of the BCLs is explained above. For the 3D network 504, a number of BCLs, T, are utilized. Each of the BCLs operate on a 3D lattice (s=3) constructed using 3D positional features at input points, $L_{in}=L_{out} \in R^{n \times 3}$. In some embodiments, each of the different BCLs utilize different lattice feature scales Λ. The lattice features scaling Λ is a diagonal matrix that controls the spacing between the grid points in the lattice. For BCLs in the network 500, the same lattice scales may be utilized along each of the X, Y, and Z directions, i.e., $\Lambda = \lambda I^{3 \times 3}$, where λ is a scalar and I denotes an identity matrix. The initial lattice scale, $\lambda_0$, is first determined for the first BCL. Subsequent lattice scales are determined by dividing the previous lattice scale by a factor of 2 ($\lambda_t = \lambda_{t-1}/2$) until the lattice scale is 2 for Tth BCL. In other words, the 3D network 504 with T BCLs use the following lattice feature scales: ($\lambda_0, \lambda_0/2, \ldots, \lambda_0/2^{T-1}$). A lower lattice feature scale corresponds to a coarser lattice and a larger receptive field for the filters.

Thus, in the 3D network 504, deeper BCLs have longer-range connectivity between input points compared to earlier layers. Similar to standard CNNs, the network 500 enables easy specification of filter neighborhoods. In some embodiments, the BCLs utilize filters operating on 1-neighborhoods (i.e., one-ring) and may have a varying number of filters per layer.

The responses of the T BCLs (e.g., the bilateral convolution layer 508, the bilateral convolution layer 510, and the bilateral convolution layer 512) are concatenated by the concatenator 514 and then passed through two additional 1×1 CONV layers, the convolution layer 516 and the convolution layer 518. The output of the convolution layer 518 passes through a SoftMax layer, which produces point-wise class label probabilities. The concatenator 514 aggregates information from different BCLs operating at different lattice scales. All the network layers, except for the convolution layer 518, are followed by ReLU and BatchNorm layers.

The network 500 utilizes convolutions on sparse lattices while receiving unordered point clouds as input. The use of BCLs in the network 500 enables easy specification of lattice spaces via input lattice features and also the lattice scale via a scaling matrix.

Changing the lattice feature scales Λ directly affects the resolution of the signal on which the convolution operates, which enables control over the receptive fields of network layers. Utilizing a coarser lattice may increase the effective receptive field of the filter. Another way to increase the receptive field of a filter is by increasing its neighborhood size. However, in high-dimensions, this will exponentially increase the number of filter weights. For example, a standard Euclidean filter with 1-neighborhood in 3D space has $3^3=27$ parameters, whereas a filter with 7-neighborhood has $7^3=343$ parameters. On the other hand, increasing the receptive field of a filter by making the lattice coarser may not increase the number of filter parameters leading to more computationally efficient network architectures.

Utilizing finer lattices (e.g., larger lattice feature scales) earlier in the network, then coarser lattices (e.g., smaller lattice feature scales) going deeper may enable a more efficient network. While XYZ lattices may be utilized generally, the BCL enable other lattice spaces, such as position and color space (XYZRGB) or normal space. Utilizing different lattice spaces enforces different connectivity across input points that may be beneficial to the task. In some embodiments, the network 500 further comprised an additional BCL with position and normal lattice features (XY-$Zn_xn_yn_z$) to improve performance.

The 3D point clouds may be accompanied by 2D images of the same scene. For example, a 3D sensor may capture RGBD video streams and perform 3D reconstruction to obtain 3D point clouds, resulting in both 2D images and point clouds of a scene together with point correspondences between the 2D and 3D. In some embodiments, point clouds along with 2D renderings may be sampled from a given 3D mesh. When such aligned 2D-3D data is present, the network 500 provides a framework for joint processing, which utilizes the joint 2D-3D network 502 along with the 3D network 504.

The joint 2D-3D network 502 is depicted in FIG. 5. The joint 2D-3D network 502 encompasses the 3D network 504 as one of its components and adds extra computational modules for joint 2D-3D processing.

The convolutional neural network 520 processes the given multi-view 2D images. The convolutional neural network 520 may utilize a standard 2D segmentation CNN architecture, which may be referred to as CNN1. In some embodiments, DeepLab segmentation architecture is utilized for the convolutional neural network 520, and the network weights are initialized with those pre-trained on a Pascal VOC segmentation dataset.

Once the output of the convolutional neural network 520 is computed for given multi-view 2D images, the output is projected onto a 3D point cloud using the bilateral convolution layer 522 with only splat and slice operations. As BCLs enable different input and output points by separate specification of input and output lattice features, $L^{in}$ and $L^{out}$, the bilateral convolution layer 522 is utilized to splat 2D features onto 3D lattice space and then slice the 3D splatted signal on the point cloud. Specifically, 3D locations of input image pixels are utilized as input lattice features, $L_{in}=L_{2D} \in R^{k \times 3}$, where k denotes the number of input image pixels. In addition, the 3D locations of points in the point cloud are utilized as output lattice features, $L^{out}=L_{3D} \in R^{m \times 3}$, which are the same lattice features utilized in the 3D network 504. The lattice feature scale, $\Lambda_a$, controls the smoothness of the projection and may be adjusted according to the sparsity of the point cloud.

The 2D-3D fusion module 524 receives the result of the convolutional neural network 520 projected onto 3D points by the bilateral convolution layer 522 as well as the intermediate features from the 3D network 504. As both of these signals are embedded in the same 3D space, the concatenator 526 concatenates these two signals and then the convolution layer 528 and the convolution layer 530, which may both be a 1×1 CONV layers, perform further processing. The output of the 2D-3D fusion module 524 may be passed onto a SoftMax layer to compute class probabilities at each input point of the point cloud.

In some embodiments, relevant 3D information is leveraged to perform better segmentation of 2D images. The 3D features computed by the 2D-3D fusion module 524 are back-projected onto the 2D images by the bilateral convolution layer 532. The bilateral convolution layer 532 may apply the reverse operation of the bilateral convolution layer 522, where the input and output lattice features are swapped. Similarly, a hyperparameter $\Lambda_b$ controls the smoothness of the projection.

The concatenator 534 concatenates the output from the convolutional neural network 520, the input images, and the output of the bilateral convolution layer 532. The concatenated result is sent to the convolutional neural network 536, which may be a 2D CNN (CNN$_2$), to obtain refined 2D semantic predictions. In some embodiments, a 2-layered network may be utilized.

The components in the network 500 are differentiable and may be trained end-to-end. Depending on the availability of 2D or 3D ground truth labels, loss functions may be defined on either one of the two domains, or on both domains in a multi-task learning setting. The network 500 results in better predictions for both 2D images and 3D point clouds. For 2D images, leveraging 3D features helps in view-consistent predictions across multi-view images. For point clouds, augmenting 2D CNNs help leverage powerful 2D deep CNN features computed on high-resolution 2D images.

Figure 6:
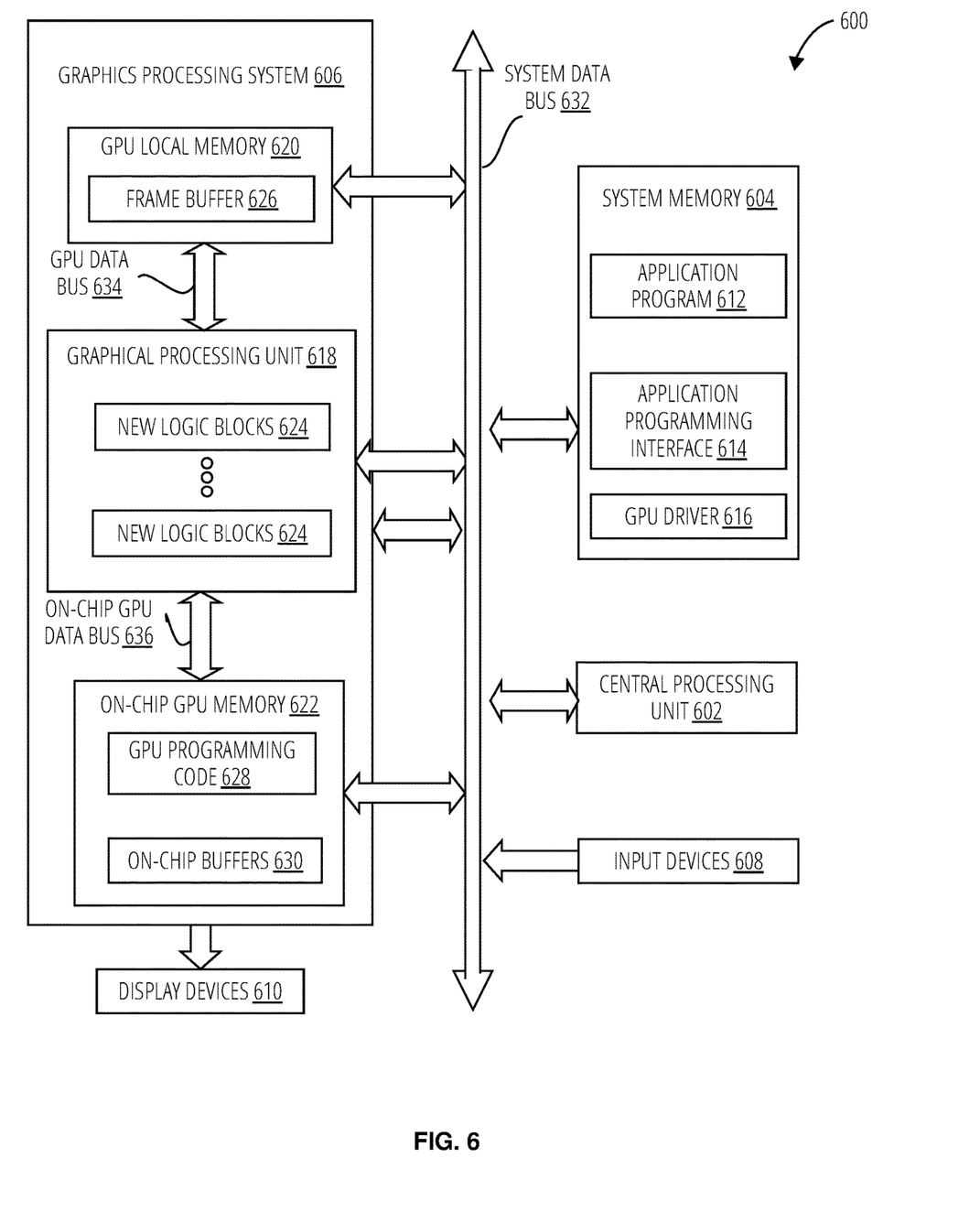
FIG. 6 is a block diagram of a computing system 600 within which the GPU or method introduced herein may be embodied or carried out.

FIG. 6 is a block diagram of one embodiment of a computing system 600 in which one or more aspects of the invention may be implemented. The computing system 600 includes a system data bus 632, a CPU 602, input devices 608, a system memory 604, a graphics processing system 606, and display devices 610. In alternate embodiments, the CPU 602, portions of the graphics processing system 606, the system data bus 632, or any combination thereof, may be integrated into a single processing unit. Further, the functionality of the graphics processing system 606 may be included in a chipset or in some other type of special purpose processing unit or co-processor.

As shown, the system data bus 632 connects the CPU 602, the input devices 608, the system memory 604, and the graphics processing system 606. In alternate embodiments, the system memory 604 may connect directly to the CPU 602. The CPU 602 receives user input from the input devices 608, executes programming instructions stored in the system memory 604, operates on data stored in the system memory 604, and configures the graphics processing system 606 to perform specific tasks in the graphics pipeline. The system memory 604 typically includes dynamic random-access memory (DRAM) employed to store programming instructions and data for processing by the CPU 602 and the graphics processing system 606. The graphics processing system 606 receives instructions transmitted by the CPU 602 and processes the instructions to render and display graphics images on the display devices 610.

As also shown, the system memory 604 includes an application program 612, an API 614 (application programming interface), and a graphics processing unit driver 616 (GPU driver). The application program 612 generates calls to the API 614 to produce a desired set of results, typically in the form of a sequence of graphics images. The application program 612 also transmits zero or more high-level shading programs to the API 614 for processing within the graphics processing unit driver 616. The high-level shading programs are typically source code text of high-level programming instructions that are designed to operate on one or more shading engines within the graphics processing system 606. The API 614 functionality is typically implemented within the graphics processing unit driver 616. The graphics processing unit driver 616 is configured to translate the high-level shading programs into machine code shading programs that are typically optimized for a specific type of shading engine (e.g., vertex, geometry, or fragment).

The graphics processing system 606 includes a GPU 618 (graphics processing unit), an on-chip GPU memory 622, an on-chip GPU data bus 636, a GPU local memory 620, and a GPU data bus 634. The GPU 618 is configured to communicate with the on-chip GPU memory 622 via the on-chip GPU data bus 636 and with the GPU local memory 620 via the GPU data bus 634. The GPU 618 may receive instructions transmitted by the CPU 602, process the instructions to render graphics data and images, and store these images in the GPU local memory 620. Subsequently, the GPU 618 may display certain graphics images stored in the GPU local memory 620 on the display devices 610.

The GPU 618 includes one or more new logic blocks 624. The operation of the new logic blocks 624 is described more fully in conjunction with Figure 2-5.

The GPU 618 may be provided with any amount of on-chip GPU memory 622 and GPU local memory 620, including none, and may employ on-chip GPU memory 622, GPU local memory 620, and system memory 604 in any combination for memory operations.

The on-chip GPU memory 622 is configured to include GPU programming 628 and on-Chip Buffers 630. The GPU programming 628 may be transmitted from the graphics processing unit driver 616 to the on-chip GPU memory 622 via the system data bus 632. The GPU programming 628 may include a machine code vertex shading program, a machine code geometry shading program, a machine code fragment shading program, or any number of variations of each. The on-Chip Buffers 630 are typically employed to store shading data that requires fast access to reduce the latency of the shading engines in the graphics pipeline. Because the on-chip GPU memory 622 takes up valuable die area, it is relatively expensive.

The GPU local memory 620 typically includes less expensive off-chip dynamic random-access memory (DRAM) and is also employed to store data and programming employed by the GPU 618. As shown, the GPU local memory 620 includes a frame buffer 626. The frame buffer 626 stores data for at least one two-dimensional surface that may be employed to drive the display devices 610. Furthermore, the frame buffer 626 may include more than one two-dimensional surface so that the GPU 618 can render to one two-dimensional surface while a second two-dimensional surface is employed to drive the display devices 610.

The display devices 610 are one or more output devices capable of emitting a visual image corresponding to an input data signal. For example, a display device may be built using a cathode ray tube (CRT) monitor, a liquid crystal display, or any other suitable display system. The input data signals to the display devices 610 are typically generated by scanning out the contents of one or more frames of image data that is stored in the frame buffer 626.

Figure 7:
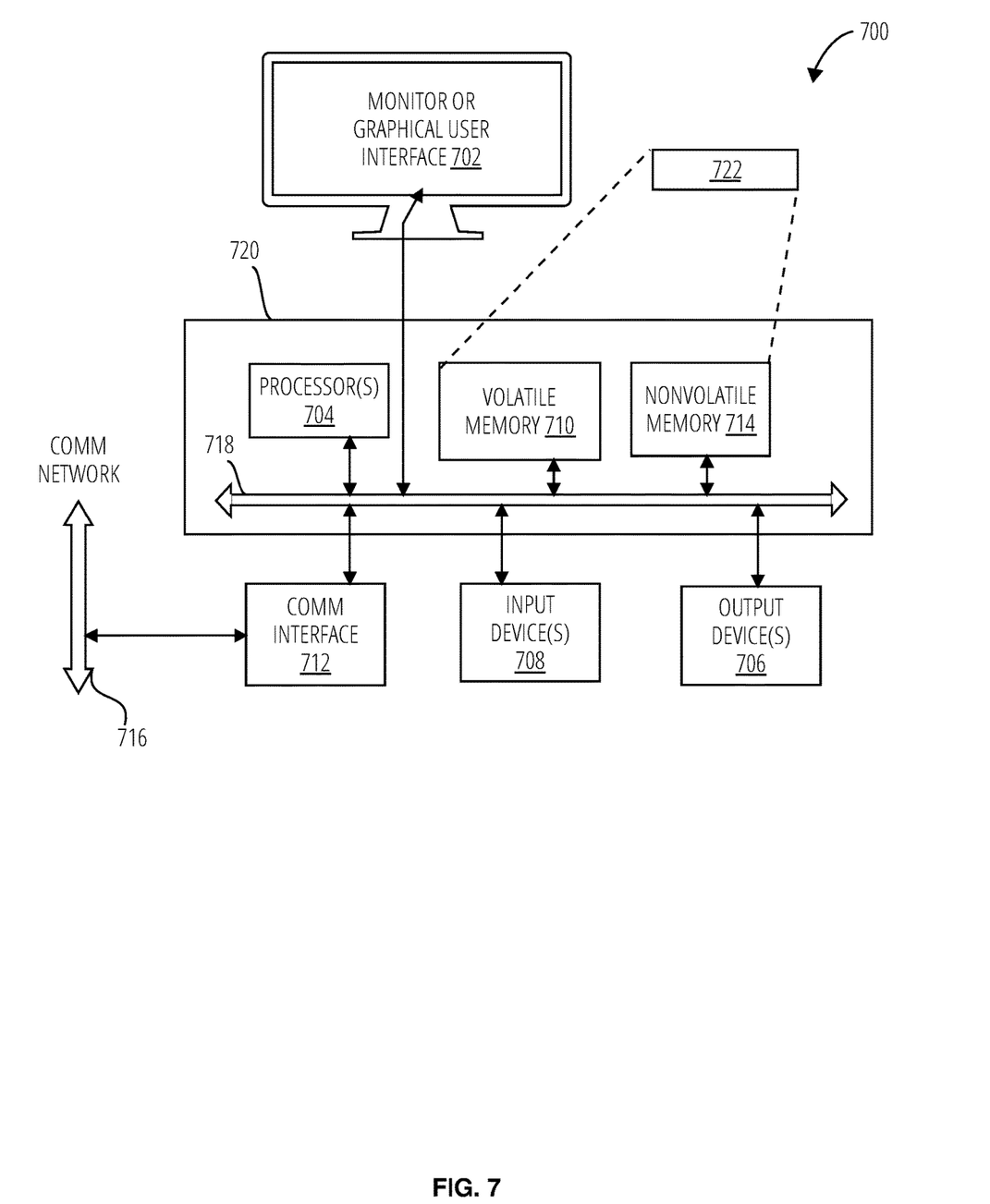
FIG. 7 is an example block diagram of a computing device 700 that may incorporate embodiments of the present invention.

FIG. 7 is an example block diagram of a computing device 700 that may incorporate embodiments of the present invention. FIG. 7 is merely illustrative of a machine system to carry out aspects of the technical processes described herein and does not limit the scope of the claims. One of ordinary skill in the art would recognize other variations, modifications, and alternatives. In one embodiment, the computing device 700 typically includes a monitor or graphical user interface 702, a data processing system 720, a communication network interface 712, input device(s) 708, output device(s) 706, and the like.

As depicted in FIG. 7, the data processing system 720 may include one or more processor(s) 704 that communicate with a number of peripheral devices via a bus subsystem 718. These peripheral devices may include input device(s) 708, output device(s) 706, communication network interface 712, and a storage subsystem, such as a volatile memory 710 and a nonvolatile memory 714.

The volatile memory 710 and/or the nonvolatile memory 714 may store computer-executable instructions and thus form logic 722 that when applied to and executed by the processor(s) 704 implement embodiments of the processes disclosed herein.

The input device(s) 708 include devices and mechanisms for inputting information to the data processing system 720. These may include a keyboard, a keypad, a touch screen incorporated into the monitor or graphical user interface 702, audio input devices such as voice recognition systems, microphones, and other types of input devices. In various embodiments, the input device(s) 708 may be embodied as a computer mouse, a trackball, a track pad, a joystick, wireless remote, drawing tablet, voice command system, eye tracking system, and the like. The input device(s) 708 typically allow a user to select objects, icons, control areas, text and the like that appear on the monitor or graphical user interface 702 via a command such as a click of a button or the like.

The output device(s) 706 include devices and mechanisms for outputting information from the data processing system 720. These may include the monitor or graphical user interface 702, speakers, printers, infrared LEDs, and so on as well understood in the art.

The communication network interface 712 provides an interface to communication networks (e.g., communication network 716) and devices external to the data processing system 720. The communication network interface 712 may serve as an interface for receiving data from and transmitting data to other systems. Embodiments of the communication network interface 712 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 712 may be coupled to the communication network 716 via an antenna, a cable, or the like. In some embodiments, the communication network interface 712 may be physically integrated on a circuit board of the data processing system 720, or in some cases may be implemented in software or firmware, such as "soft modems", or the like.

The computing device 700 may include logic that enables communications over a network using protocols such as HTTP, TCP/IP, RTP/RTSP, IPX, UDP and the like.

The volatile memory 710 and the nonvolatile memory 714 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMs, DVDs, semiconductor memories such as flash memories, non-transitory read-only-memories (ROMS), battery-backed volatile memories, networked storage devices, and the like. The volatile memory 710 and the nonvolatile memory 714 may be configured to store the basic programming and data constructs that provide the functionality of the disclosed processes and other embodiments thereof that fall within the scope of the present invention.

Logic 722 that implements embodiments of the present invention may be stored in the volatile memory 710 and/or the nonvolatile memory 714. Said logic 722 may be read from the volatile memory 710 and/or nonvolatile memory 714 and executed by the processor(s) 704. The volatile memory 710 and the nonvolatile memory 714 may also provide a repository for storing data used by the logic 722.

The volatile memory 710 and the nonvolatile memory 714 may include a number of memories including a main random-access memory (RAM) for storage of instructions and data during program execution and a read only memory (ROM) in which read-only non-transitory instructions are stored. The volatile memory 710 and the nonvolatile memory 714 may include a file storage subsystem providing persistent (non-volatile) storage for program and data files. The volatile memory 710 and the nonvolatile memory 714 may include removable storage systems, such as removable flash memory.

The bus subsystem 718 provides a mechanism for enabling the various components and subsystems of data processing system 720 communicate with each other as intended. Although the communication network interface 712 is depicted schematically as a single bus, some embodiments of the bus subsystem 718 may utilize multiple distinct busses.

It will be readily apparent to one of ordinary skill in the art that the computing device 700 may be a device such as a smartphone, a desktop computer, a laptop computer, a rack-mounted computer system, a computer server, or a tablet computer device. As commonly known in the art, the computing device 700 may be implemented as a collection of multiple networked computing devices. Further, the computing device 700 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A machine-vision method comprising:
   filtering a point cloud transformation of a three dimensional object to generate a three dimensional lattice;
   processing the three dimensional lattice through a series arrangement of bilateral convolution artificial neural networks (BCL), each BCL in the series having a lower lattice feature scale than a preceding BCL in the series;
   concatenating an output of each BCL in the series to generate an intermediate three dimensional lattice; and
   further filtering the intermediate three dimensional lattice to generate a first prediction of features of the three dimensional object.

2. The method of claim 1, wherein the filtering and further filtering are carried out using 1×1 convolution layers.

3. The method of claim 1, further comprising:
   projecting multiple two dimensional images onto the intermediate three dimensional lattice to generate a merged three dimensional lattice.

4. The method of claim 3, further wherein projecting the two dimensional images comprises:
   processing the two dimensional images through a first convolution neural network; and
   applying an output of the first convolution neural network to a subsequent layer.

5. The method of claim 4, further comprising:
   transforming the merged three dimensional lattice into a second prediction of features of the three dimensional object using a series arrangement of convolution layers.

6. The method of claim 5, wherein each of the convolution layers is a 1×1 convolution layer.

7. The method of claim 5, further comprising:
   back-projecting the second prediction of features of the three dimensional object onto the two dimensional images.

8. The method of claim 7, further comprising:
   concatenating the two dimensional images, the output of the first convolution neural network, and the second prediction of features of the three dimensional object into a merged projection; and
   transforming the merged projection into a prediction of two dimensional object features.

9. A machine-vision system comprising:
   at least one processor;
   a memory coupled to the at least one processor, the memory configured with a point cloud representation of an object; and
   logic to configure the at least one processor to:
     process the point cloud representation through a series arrangement of bilateral convolution artificial neural networks (BCL), each BCL in the series having a lower feature scale than a preceding BCL in the series arrangement;

concatenate outputs of two or more of the BCLs in the series arrangement to generate an intermediate representation of the point cloud; and process the intermediate representation to generate a first prediction of features of the object.

10. The system of claim 9, further comprising logic to configure the at least one processor to:

process the intermediate representation using a 1x1 convolution layer.

11. The system of claim 9, further comprising logic to configure the at least one processor to:

project multiple two dimensional images onto the intermediate representation to generate a three dimensional representation.

12. The system of claim 11, further comprising logic to configure the at least one processor to:

process the two dimensional images through a first convolution neural network; and apply an output of the first convolution neural network to a subsequent neural network.

13. The system of claim 12, further comprising logic to configure the at least one processor to:

transform the three dimensional representation into a second prediction of features of the object using a series arrangement of convolution layers.

14. The system of claim 13, wherein each of the convolution layers in the series arrangement of convolution layers is a 1×1 convolution layer.

15. The system of claim 13, further comprising logic to configure the at least one processor to:

back-project the second prediction of features of the object onto the two dimensional images.

16. The system of claim 15, further comprising logic to configure the at least one processor to:

concatenate the two dimensional images, the output of the first convolution neural network, and the second prediction of features of the object into a merged projection.

17. A machine-vision method comprising:

processing a point cloud lattice through a series arrangement of convolutional neural networks that utilize bilateral filtering;

concatenating outputs of two or more convolutional neural networks in the series arrangement to generate an intermediate lattice;

processing the intermediate lattice to predict features of the object; and back-project the predicted features of the object onto two-dimensional images of the object.

18. The system of claim 17, further comprising logic to configure the at least one processor to:

form the intermediate lattice in two dimensions; and project the two-dimensional images onto the intermediate lattice to generate a three-dimensional lattice.

* * * * *